US008625270B2

(12) United States Patent
Ni et al.

(10) Patent No.: US 8,625,270 B2
(45) Date of Patent: Jan. 7, 2014

(54) USB FLASH DRIVE WITH DEPLOYING AND RETRACTING FUNCTIONALITIES USING RETRACTABLE COVER/CAP

(75) Inventors: Jim Chin-Nan Ni, San Jose, CA (US); Abraham C. Ma, Fremont, CA (US)

(73) Assignee: Super Talent Technology, Corp., San Jose, CA (US)

( * ) Notice: Subject to any disclaimer, the term of this patent is extended or adjusted under 35 U.S.C. 154(b) by 176 days.

(21) Appl. No.: 13/267,699

(22) Filed: Oct. 6, 2011

(65) Prior Publication Data

US 2012/0026661 A1 Feb. 2, 2012

Related U.S. Application Data

(63) Continuation-in-part of application No. 11/845,747, filed on Aug. 27, 2007, now abandoned, and a continuation-in-part of application No. 09/478,720, filed on Jan. 6, 2000, now Pat. No. 7,257,714, and a continuation-in-part of application No. 09/366,976, filed on Aug. 4, 1999, now Pat. No. 6,547,130, and a continuation-in-part of application No. 12/552,250, filed on Sep. 1, 2009, now Pat. No. 8,102,662.

(51) Int. Cl.
*G06F 1/16* (2006.01)
(52) U.S. Cl.
USPC .................. 361/679.31; 361/728; 361/679.02
(58) Field of Classification Search
USPC ........ 361/679.02, 679.31, 679.4, 679.01, 728
See application file for complete search history.

(56) References Cited

U.S. PATENT DOCUMENTS

| 4,582,985 | A | 4/1986 | Lofberg |
| 4,630,201 | A | 12/1986 | White |
| 4,686,506 | A | 8/1987 | Farago |
| 4,766,293 | A | 8/1988 | Boston |
| 4,818,239 | A | 4/1989 | Erk |
| 4,833,554 | A | 5/1989 | Dalziel et al. |

(Continued)

FOREIGN PATENT DOCUMENTS

| JP | 63-163589 A | 7/1988 |
| JP | 02-118790 A | 5/1990 |
| JP | 11-039483 | 2/1999 |

OTHER PUBLICATIONS

USB 'A' Plug Form Factor, Revision 0.9, Guideline for Embedded USB Device Applications, Nov. 29, 2004, 4 pages.

(Continued)

*Primary Examiner* — Bernard Rojas
(74) *Attorney, Agent, or Firm* — Bever, Hoffman & Harms, LLP; Patrick T. Bever

(57) ABSTRACT

A pen-type computer peripheral device includes an elongated housing containing a PCBA having a plug connector, and cap/cover that is slidably connected to a front portion of the housing. Locking structures are respectively integrally molded onto opposing surfaces of the housing and cap/cover that cooperate to prevent separation of the cap/cover from the housing. By manually pushing (sliding) the cap/cover relative to the housing, the plug connector is effectively moved between a retracted position, in which the plug connector is disposed inside the cap/cover, and a deployed position in which the plug connector extends through a front housing opening of the cap/cover such that the plug connector is operably exposed for insertion into a host system.

7 Claims, 11 Drawing Sheets

(56) References Cited

U.S. PATENT DOCUMENTS

| | | |
|---|---|---|
| 4,926,480 A | 5/1990 | Chaum |
| 5,020,105 A | 5/1991 | Rosen et al. |
| 5,180,901 A | 1/1993 | Hiramatsu |
| 5,280,527 A | 1/1994 | Gullman et al. |
| 5,330,360 A | 7/1994 | Marsh et al. |
| 5,339,222 A | 8/1994 | Simmons et al. |
| 5,386,340 A | 1/1995 | Kurz |
| 5,397,857 A | 3/1995 | Farquhar et al. |
| 5,404,485 A | 4/1995 | Ban |
| 5,414,597 A | 5/1995 | Lindland et al. |
| 5,420,412 A | 5/1995 | Kowaiski |
| 5,430,859 A | 7/1995 | Norman et al. |
| 5,450,396 A | 9/1995 | Havermans |
| 5,476,387 A | 12/1995 | Ramey et al. |
| 5,479,638 A | 12/1995 | Assar et al. |
| 5,530,622 A | 6/1996 | Takiar et al. |
| 5,623,552 A | 4/1997 | Lane |
| 5,718,599 A | 2/1998 | Ichikawa et al. |
| 5,725,395 A | 3/1998 | Lee et al. |
| 5,766,033 A | 6/1998 | Davis |
| 5,772,453 A | 6/1998 | Tan et al. |
| 5,797,771 A | 8/1998 | Garside |
| 5,821,614 A | 10/1998 | Hashimoto et al. |
| 5,835,760 A | 11/1998 | Harmer |
| 5,899,773 A | 5/1999 | Cheng |
| 5,907,856 A | 5/1999 | Estakhri et al. |
| 5,941,733 A | 8/1999 | Lai et al. |
| 5,959,541 A | 9/1999 | DiMaria et al. |
| 5,984,731 A | 11/1999 | Laity |
| 6,000,006 A | 12/1999 | Bruce et al. |
| 6,012,636 A | 1/2000 | Smith |
| 6,027,375 A | 2/2000 | Wu et al. |
| 6,044,428 A | 3/2000 | Rayabhari |
| 6,069,920 A | 5/2000 | Schulz et al. |
| 6,069,970 A | 5/2000 | Salatino et al. |
| 6,081,858 A | 6/2000 | Abudayyeh et al. |
| 6,089,879 A | 7/2000 | Babcock |
| 6,091,605 A | 7/2000 | Ramey et al. |
| 6,125,192 A | 9/2000 | Bjorn et al. |
| 6,132,243 A | 10/2000 | Hirata et al. |
| 6,148,354 A | 11/2000 | Ban et al. |
| 6,159,039 A | 12/2000 | Wu |
| 6,165,016 A | 12/2000 | Lai |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,231,363 B1 | 5/2001 | Kosmala |
| 6,241,534 B1 | 6/2001 | Neer et al. |
| 6,275,894 B1 | 8/2001 | Kuo et al. |
| 6,279,955 B1 | 8/2001 | Fisher |
| 6,292,863 B1 | 9/2001 | Terasaki et al. |
| 6,297,448 B1 | 10/2001 | Hara |
| 6,313,400 B1 | 11/2001 | Mosquera et al. |
| 6,314,479 B1 | 11/2001 | Frederick et al. |
| 6,321,478 B1 | 11/2001 | Klebes |
| 6,334,793 B1 | 1/2002 | Amoni et al. |
| 6,354,883 B2 | 3/2002 | Jaing |
| 6,385,677 B1 | 5/2002 | Yao |
| 6,438,638 B1 | 8/2002 | Jones et al. |
| 6,439,464 B1 | 8/2002 | Fruhauf et al. |
| 6,445,088 B1 | 9/2002 | Spitaels et al. |
| 6,453,371 B1 | 9/2002 | Hampson et al. |
| 6,456,500 B1 | 9/2002 | Chen |
| 6,475,830 B1 | 11/2002 | Brillhart |
| 6,480,390 B2 | 11/2002 | Matsumiya et al. |
| 6,490,163 B1 | 12/2002 | Pua et al. |
| 6,533,612 B1 | 3/2003 | Lee et al. |
| 6,547,130 B1 | 4/2003 | Shen |
| 6,554,648 B2 | 4/2003 | Shi et al. |
| 6,561,421 B1 | 5/2003 | Yu |
| 6,567,273 B1 | 5/2003 | Liu et al. |
| 6,578,768 B1 | 6/2003 | Binder et al. |
| 6,581,122 B1 | 6/2003 | Sarat |
| 6,599,152 B1 | 7/2003 | Oliphant et al. |
| 6,602,088 B1 | 8/2003 | Zhu |
| 6,609,928 B1 | 8/2003 | Le |
| 6,615,404 B1 | 9/2003 | Garfunkel et al. |
| 6,618,243 B1 | 9/2003 | Tirosh |
| 6,624,005 B1 | 9/2003 | DiCaprio et al. |
| 6,628,498 B2 | 9/2003 | Whitney et al. |
| 6,636,929 B1 | 10/2003 | Frantz et al. |
| 6,658,516 B2 | 12/2003 | Yao |
| 6,659,805 B2 | 12/2003 | Siddiqui et al. |
| 6,671,808 B1 | 12/2003 | Abbott et al. |
| 6,676,420 B1 | 1/2004 | Liu et al. |
| 6,692,268 B2 | 2/2004 | Kung et al. |
| 6,692,312 B1 | 2/2004 | Semmeling et al. |
| 6,705,902 B1 | 3/2004 | Yi et al. |
| 6,712,646 B2 | 3/2004 | Shindo |
| 6,717,817 B2 | 4/2004 | Liu et al. |
| 6,718,407 B2 | 4/2004 | Martwick |
| 6,719,570 B2 | 4/2004 | Tsuchioka |
| 6,733,329 B2 | 5/2004 | Yang |
| 6,743,030 B2 | 6/2004 | Lin et al. |
| 6,745,267 B2 | 6/2004 | Chen et al. |
| 6,752,321 B1 | 6/2004 | Leaming |
| 6,757,783 B2 | 6/2004 | Koh |
| 6,758,685 B1 | 7/2004 | Huang et al. |
| 6,763,408 B1 | 7/2004 | Sonoda |
| 6,763,410 B2 | 7/2004 | Yu |
| D494,969 S | 8/2004 | Lin |
| 6,773,192 B1 | 8/2004 | Chao |
| 6,778,401 B1 | 8/2004 | Yu et al. |
| 6,792,487 B2 | 9/2004 | Kao |
| 6,801,971 B1 | 10/2004 | Devine et al. |
| 6,808,400 B2 | 10/2004 | Tu |
| 6,813,662 B2 | 11/2004 | Park |
| 6,832,281 B2 | 12/2004 | Jones et al. |
| 6,854,984 B1 | 2/2005 | Lee et al. |
| 6,857,897 B2 | 2/2005 | Conn |
| 6,860,609 B2 | 3/2005 | Olson et al. |
| 6,871,244 B1 | 3/2005 | Cahill et al. |
| 6,874,044 B1 | 3/2005 | Chou et al. |
| 6,880,024 B2 | 4/2005 | Chen et al. |
| 6,890,207 B2 | 5/2005 | Kobayashi |
| 6,900,988 B2 | 5/2005 | Yen |
| 6,908,038 B1 | 6/2005 | Le |
| 6,908,330 B2 | 6/2005 | Garrett et al. |
| 6,932,629 B2 | 8/2005 | Ikenoue |
| 6,940,153 B2 | 9/2005 | Spencer et al. |
| 6,944,028 B1 | 9/2005 | Yu et al. |
| 6,979,210 B2 | 12/2005 | Regen et al. |
| 6,980,188 B1 | 12/2005 | Worley, III et al. |
| 7,004,780 B1 | 2/2006 | Wang |
| 7,009,847 B1 | 3/2006 | Wu et al. |
| 7,011,247 B2 | 3/2006 | Drabczuk et al. |
| 7,015,148 B1 | 3/2006 | Lukanc et al. |
| 7,021,971 B2 | 4/2006 | Chou et al. |
| 7,074,052 B1 | 7/2006 | Ni et al. |
| 7,090,541 B1 | 8/2006 | Ho |
| 7,095,617 B1 * | 8/2006 | Ni ................................. 361/736 |
| 7,103,765 B2 | 9/2006 | Chen |
| 7,104,807 B1 | 9/2006 | Wang et al. |
| 7,104,809 B1 | 9/2006 | Huang |
| 7,104,814 B1 | 9/2006 | She et al. |
| 7,104,848 B1 | 9/2006 | Chou et al. |
| 7,108,560 B1 | 9/2006 | Chou et al. |
| 7,125,287 B1 | 10/2006 | Chou et al. |
| 7,153,148 B2 | 12/2006 | Chen et al. |
| 7,172,460 B2 | 2/2007 | Zhao et al. |
| 7,182,646 B1 | 2/2007 | Chou et al. |
| 7,186,147 B1 | 3/2007 | Chou et al. |
| 7,249,978 B1 | 7/2007 | Ni |
| 7,257,714 B1 | 8/2007 | Shen |
| 7,259,967 B2 | 8/2007 | Ni |
| 7,296,098 B2 | 11/2007 | Shih |
| 7,307,849 B2 | 12/2007 | Ho et al. |
| 7,359,208 B2 | 4/2008 | Ni |
| 7,361,032 B2 | 4/2008 | Loftus |
| 7,364,090 B2 | 4/2008 | Cuellar et al. |
| 7,416,419 B2 | 8/2008 | Collantes, Jr. et al. |
| 7,422,454 B1 | 9/2008 | Tang et al. |
| 7,540,786 B1 | 6/2009 | Koser et al. |
| 7,632,113 B2 | 12/2009 | Finn |

(56) References Cited

U.S. PATENT DOCUMENTS

| | | |
|---|---|---|
| 7,704,084 B1 | 4/2010 | Cheng |
| 7,778,037 B2 | 8/2010 | Huang |
| 7,869,219 B2 | 1/2011 | Ma et al. |
| 2001/0038547 A1 | 11/2001 | Jigour et al. |
| 2001/0043174 A1 | 11/2001 | Jacobsen et al. |
| 2002/0036922 A1 | 3/2002 | Roohparvar |
| 2002/0116668 A1 | 8/2002 | Chhor et al. |
| 2002/0166023 A1 | 11/2002 | Nolan et al. |
| 2003/0038043 A1 | 2/2003 | Painsith |
| 2003/0046510 A1 | 3/2003 | North |
| 2003/0094490 A1 | 5/2003 | Lee |
| 2003/0100203 A1 | 5/2003 | Yen |
| 2003/0104835 A1 | 6/2003 | Douhet |
| 2003/0145141 A1 | 7/2003 | Chen et al. |
| 2003/0154340 A1 | 8/2003 | Bolt et al. |
| 2003/0163656 A1 | 8/2003 | Ganton |
| 2003/0177300 A1 | 9/2003 | Lee et al. |
| 2003/0182528 A1 | 9/2003 | Ajiro |
| 2003/0223286 A1 | 12/2003 | Lee |
| 2003/0229748 A1 | 12/2003 | Brewer et al. |
| 2004/0034765 A1 | 2/2004 | James |
| 2004/0066693 A1 | 4/2004 | Osako |
| 2004/0087213 A1 | 5/2004 | Kao |
| 2004/0137664 A1 | 7/2004 | Elazar et al. |
| 2004/0143716 A1 | 7/2004 | Hong |
| 2004/0145875 A1 | 7/2004 | Yu et al. |
| 2004/0148482 A1 | 7/2004 | Grundy et al. |
| 2004/0153595 A1 | 8/2004 | Sukegawa et al. |
| 2004/0195339 A1 | 10/2004 | Chen et al. |
| 2004/0255054 A1 | 12/2004 | Pua et al. |
| 2005/0009388 A1 | 1/2005 | Chao |
| 2005/0048846 A1 | 3/2005 | Suzuki et al. |
| 2005/0059301 A1 | 3/2005 | Chou et al. |
| 2005/0085133 A1 | 4/2005 | Wang et al. |
| 2005/0102444 A1 | 5/2005 | Cruz |
| 2005/0114587 A1 | 5/2005 | Chou et al. |
| 2005/0120146 A1 | 6/2005 | Chen et al. |
| 2005/0160213 A1 | 7/2005 | Chen |
| 2005/0182858 A1 | 8/2005 | Lo et al. |
| 2005/0193161 A1 | 9/2005 | Lee et al. |
| 2005/0193162 A1 | 9/2005 | Chou et al. |
| 2005/0216624 A1 | 9/2005 | Deng et al. |
| 2005/0218200 A1 | 10/2005 | Focke et al. |
| 2005/0246243 A1 | 11/2005 | Adams et al. |
| 2005/0248926 A1 | 11/2005 | Asom et al. |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0184709 A1 | 8/2006 | Sukegawa et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0113067 A1 | 5/2007 | Oh et al. |
| 2007/0113267 A1 | 5/2007 | Iwanski et al. |
| 2007/0130436 A1 | 6/2007 | Shen |
| 2008/0093720 A1 | 4/2008 | Hiew et al. |
| 2008/0094807 A1 | 4/2008 | Hiew et al. |
| 2009/0124104 A1 | 5/2009 | Zhu et al. |
| 2010/0124831 A1 | 5/2010 | Chou et al. |
| 2010/0315762 A1* | 12/2010 | Lo .................................. 361/600 |

OTHER PUBLICATIONS

USB FlashCard "Main Body Dimensions", "Top View", "Bottom View" Web pages, Lexar, 2004, 3 pages.

* cited by examiner

USB FLASH DRIVE WITH DEPLOYING AND RETRACTING FUNCTIONALITIES USING RETRACTABLE COVER/CAP

RELATED APPLICATIONS

This application is a continuation in part of U.S. patent application for "PRESS/PUSH USB FLASH DRIVE WITH DEPLOYING AND RETRACTING FUNCTIONALITIES WITH ELASTICITY MATERIAL AND FINGERPRINT VERIFICATION CAPABILITY", U.S. application Ser. No. 11/845,747, filed Aug. 27, 2007, which is a continuation in part of U.S. patent application for "ELECTRONIC DATA STORAGE MEDIUM WITH FINGERPRINT VERIFICATION CAPABILITY", U.S. application Ser. No. 09/478,720, filed Jan. 6, 2000, which has been petitioned claiming benefit of Continuation-In-Process status of one of inventor's earlier U.S. patent application for "INTEGRATED CIRCUIT CARD WITH FINGERPRINT VERIFICATION CAPABILITY", U.S. application Ser. No. 09/366,976, filed Aug. 4, 1999, now issued as U.S. Pat. No. 6,547,130.

This application is also a continuation in part of U.S. patent application for "USB PACKAGE WITH BISTABLE SLIDING MECHANISM", Ser. No. 12/552,250, filed Sep. 1, 2009.

This application relates to U.S. Pat. No. 7,004,780, filed on May 13, 2004, and entitled "PORTABLE COMPUTER PERIPHERAL APPARATUS WITH RETRACTABLE PLUG CONNECTOR".

BACKGROUND OF THE INVENTION

1. Field of the Invention

The invention relates to an electronic data storage medium, more particularly to an electronic data storage medium and to a standard USB flash drive with deploying and retracting functions using press and push style.

2. Description of the Related Art

Recently there is an ongoing trend towards the use of miniaturized, portable computer peripheral devices to store confidential data. In certain cases, such peripheral devices have been reduced to "pocket size", meaning that they can literally be carried in a user's pocket in the same manner as a wallet or set of keys. One example of particular interest, in which context the present invention will be described herein, is a "flash disk", or "Universal Serial Bus (USB) flash drive". For example, one product includes a pen-type flash device having a USB connector plug that can be connected to a USB port of a standard computer. The USB plug connector is protected by a removable cover when not in use. A problem with convention pen-type peripheral devices is that the removable cover can become inadvertently lost while the device is in use, thereby leaving the USB plug connector exposed to damage or contamination.

What is needed is a pen-type portable computer peripheral device that overcomes the problems associated with conventional structures.

SUMMARY OF THE INVENTION

The present invention is directed to a low-cost pen-type portable computer peripheral device (apparatus) having a simple plastic elongated housing for securing and protecting a PCBA including at least one electronic device, and a plastic cap/cover that is mounted onto the front end of the housing such that the cap/cover is slidable along the housing between a retracted position, in which a plug connector (e.g., a USB plug connector) is positioned inside of the cap/cover, and a deployed position in which the plug connector extends through a front opening defined in the cap/cover such that the plug connector is exposed outside of the peripheral device for insertion into a host system. According to an aspect of the invention, one or more locking mechanisms (e.g., locking tabs and slots) are respectively integrally molded onto the cap/cover and housing, and these integral locking mechanisms serve to both maintain the cap/cover in the deployed and retracted position, and to prevent the cap/cover from being separated from the housing (i.e., no separate locking mechanisms, fasteners or springs are included in the peripheral device assembly to serve either of these functions). The cap/cover is manually moved from the retracted position to the deployed position by forcing the cap/cover out of the retracted position and sliding the cap/cover along the housing to the deployed position. The resulting peripheral device is both very inexpensive to produce (i.e., other than the PCBA, the entire device structure is produced by injection molded plastic parts) and very inexpensive to assemble (i.e., the entire post-PCBA-production assembly process involves snap-coupling a small number of pieces together). As such, the peripheral device of the present invention has substantially the same low manufacturing costs of conventional removable-cap-type pen-type peripheral devices, and also serves to maintain connection between the cap/cover and the elongated housing when the plug connector is in the deployed position, thereby providing a convenient means for protecting the plug connector from damage and contamination without the need for a removable cap, which can be lost.

According to an embodiment of the present invention, the locking mechanism is implemented by a wedge-shaped locking tab disposed on and extending downward from an inside surface of the cap/cover, and by an elongated locking groove defined in an upward-facing surface of the upper housing wall near the front end of the housing. The wedge-shaped locking tab is engaged into the locking groove at assembly, and remains engaged inside (i.e., extends into) the locking groove at all times following assembly (i.e., in both the deployed and retracted positions, and when the cap/cover is moved between the deployed and retracted positions). The wedge-shaped locking tab is characterized by having a ramp-like rear surface that facilitates the assembly process, and a flat front edge that abuts a flat end wall of the locking groove when the cap-cover is in the retracted position. This arrangement prevents detachment of the cap/cover from the housing body after assembly using only features that are integrally molded onto the cap/cover and housing, thereby minimizing manufacturing and assembly costs. According to one aspect, the elongated locking groove includes short sloped ridge structures that maintain the wedge-shaped locking tab in the deployed and retracted position (e.g., movement of said cap/cover from the retracted position requires applying a slightly increased manual force in order to force/slide the wedge-shaped locking tab over one of the sloped ridge structure). According to another aspect, elongated sliding ribs are integrally molded onto the upper housing wall and extend along opposing sides of the elongated locking groove to maintain an optimal distance between the cap/cover and the housing in order to facilitate movement of the wedge-shaped locking tab over the sloped ridge structures).

According to another aspect of the present invention, the housing is formed using either one or two integrally molded plastic structures that facilitate easy assembly with the PCBA such that mounting structures that are integrally molded to the inside surface of the housing serve support the side edges of PCB and engage cut-outs formed in side edges of the PCB.

According to an embodiment of the present invention, the elongated housing is implemented as a single-piece (integrally molded) tubular structure having both front and rear openings, and the peripheral device includes a rear cap that is snap-coupled over the rear opening after the PCBA is inserted into the elongated housing. This arrangement provides both a rigid housing structure and easy assembly of the PCBA, and the rear cap also serves as a handle for manually pulling and pushing the cap/cover into the retracted/deployed positions. An optional key-chain opening is defined in the rear cap for connecting the peripheral device to a key ring or string. Rib-like protrusions are also integrally molded onto an outside surface of the cap/cover and the rear cap to facilitate manual positioning of the cap/cover along the elongated housing.

According to another embodiment of the present invention, the elongated housing is implemented by a two-part structure that is snapped together to enclose the PCBA. This arrangement provides a more streamlined structure. Longitudinal grooves are formed in the housing walls and rib-like protrusions are integrally molded onto an outside surface of the cap/cover to facilitate manually pulling and pushing the cap/cover into the retracted/deployed positions. An optional key-chain opening is defined in a rear portion of the housing for connecting the peripheral device to a key ring or string.

According to another embodiment of the present invention, a method for assembling a portable computer peripheral apparatus includes fixedly connecting a printed circuit board assembly (PCBA) onto an elongated housing consisting entirely of one or more integrally molded plastic structures, and then mounting a cap/cover onto a front portion of the housing, wherein the cap/cover comprising an integrally molded structure including an upper wall having a second locking structure formed thereon. As set forth above, by utilizing the novel features of the present invention, the assembly method requires a minimum number of assembly steps, whereby the assembly costs associated with peripheral devices formed in accordance with the present invention are greatly reduced over those associated with conventional pen-type peripheral devices.

BRIEF DESCRIPTION OF THE DRAWING

Other features and advantages of the present invention will become apparent in the following detailed description of the preferred embodiment with reference to the accompanying drawings, of which.

DETAILED DESCRIPTION OF THE PREFERRED EMBODIMENT

The present invention relates to an improvement in low-cost computer peripheral devices. The following description is presented to enable one of ordinary skill in the art to make and use the invention as provided in the context of a particular application and its requirements. As used herein, directional terms such as "upper", "upward", "lower", "downward", "front", "rear", are intended to provide relative positions for purposes of description, and are not intended to designate an absolute frame of reference. In addition, the phrases "integrally connected" and "integrally molded" are used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

As set forth in the specific embodiments below, the present invention is directed to pocket-sized, pen-type portable computer peripheral devices that are connected by plug connectors to host computer systems to perform programming, data retrieving and data resetting functions in accordance with known techniques. In particular, as described below with reference to the embodiments shown in FIGS. 1-10, the present invention is directed to peripheral devices in which a USB plug connector is selectively retracted or otherwise protected inside a cap/cover when not in use, and selectively deployed (i.e., exposed outside of the cap/cover) when in use.

Figure 1A:
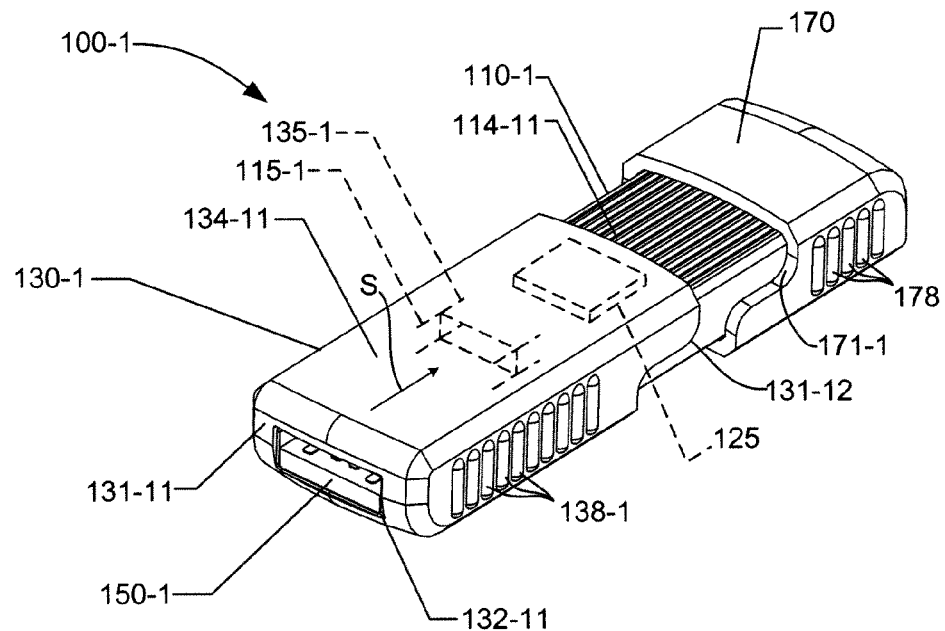
FIGS. 1(A) and 1(B) are top front perspective views showing a pen-type computer peripheral device in alternative closed and open positions, respectively, according to an embodiment of the present invention.
Figure 1B:
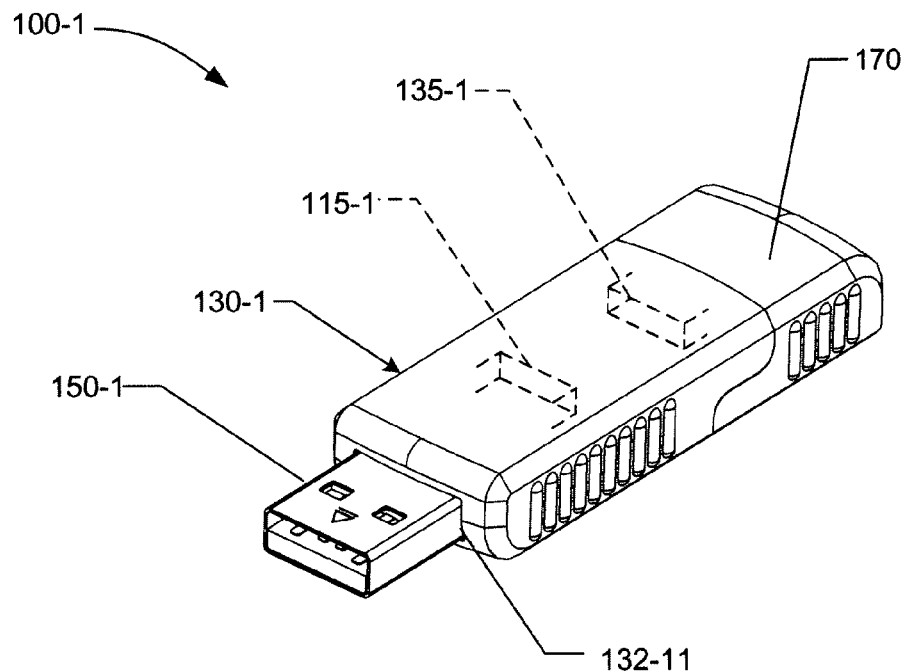

FIGS. 1(A) and 1(B) show a pocket-sized, pen-type (i.e., retractable) portable computer peripheral device 100-1 according to a first specific embodiment, where FIG. 1(A) shows peripheral device 100-1 in a fully retracted state, and FIG. 1(B) shows peripheral device 100-1 in a fully deployed state. Peripheral device 100-1 includes a plastic elongated housing 110-1 that surrounds (houses) and protects a PCBA (discussed in additional detail below) including at least one electronic device 125 (shown in dashed lines in FIG. 1(A)), a plastic cap/cover 130-1 that is mounted onto the front portion of housing 110-1 such that cap/cover 130-1 is slidable along the front portion of housing 110-1 between the retracted position (shown in FIG. 1(A)) and the deployed position (shown in FIG. 1(B)), and an rear cap 170 that is fixedly connected onto the rear portion of housing 110-1. When peripheral device 100-1 is in the deployed position shown in FIG. 6(B), a USB plug connector 150-1, which is fixedly connected to the PCBA and extends from a front portion of housing 110-1, protrudes through a front opening 132-11 defined in a front wall 131-11 of cap/cover 130-1 such that plug connector 150-1 is exposed outside of peripheral device 100-1 for insertion into a host system. Conversely, when peripheral device 100-1 is in the retracted position shown in FIG. 1(A), USB plug connector 150-1 is retracted into (i.e., positioned inside of) cap/cover 130-1, and is thereby protected from damage during transport in a user's pocket or other periods of non-use.

According to an aspect of the present invention, the deploying/retracting operations of peripheral device 100-1 are entirely manually performed. To deploy USB plug connector 150-1 for use, a user holds cap/cover 130-1 in one hand and rear cap 170 in the other hand, and manually pushes cap/cover 130-1 toward rear cap 170 (i.e., in the direction of arrow S shown in FIG. 1(A)). Note that optional rib protrusions 138-1 and 178 are respectively integrally molded onto cap/cover 130-1 and rear cap 170 to facilitate this manual operation. Once sufficient manual force is exerted to overcome the resistance provided by a locking structure (described below) that holds cap/cover 130-1 in the retracted position, cap/cover 130-1 slides along housing 110-1 until a rear edge 131-12 of cap/cover 130-1 abuts a front peripheral edge 171-1 of rear cap 170. Conversely, to retract USB plug connector 150-1 for storage/transport, a user holds cap/cover 130-1 in one hand and rear cap 170 in the other hand, and manually pulls cap/cover 130-1 away from rear cap 170 (i.e., in a direction opposite to arrow S shown in FIG. 1(A)). Once sufficient manual force is exerted to overcome a locking structure holding cap/cover 130-1 in the deployed position, cap/cover 130-1 slides along housing 110-1 until a (first) locking structure 115-1 abuts a (second) locking structure 135-1, as shown in FIG. 1(A) and described in additional detail below. Note that locking structures 115-1 and 135-1 (shown in dashed lines in FIGS. 1(A) and 1(B)) are integrally molded onto opposing surfaces of housing 110-1 and cap/cover 130-1, respectively, and integral locking structures 115-1 and 135-1 are formed to prevent separation of cap/cover 130-1 from the front portion of housing 110-1. That is, once plug connector 150-1 is in the fully-retracted position, further movement of cap/cover 130-1 on housing 110-1 away from rear cap 170 of the elongated housing is prevented by the contact between (first) locking structure 115-1 and (second) locking structure 135-1.

According to another aspect of the present invention, cap/cover 130-1 remains attached to housing 110-1 at all times after assembly. That is, as shown in FIG. 1(A), cap/cover 130-1 is attached to housing 110-1 when peripheral device 100-1 is in the retracted state, and, as shown in FIG. 1(B), cap/cover 130-1 is attached to housing 110-1 when peripheral device 100-1 is in the deployed state. Further, as described below with reference to FIGS. 5(A)-5(D), cap/cover 130-1 remains attached to housing 110-1 during deploying operations (i.e., when peripheral device 100-1 is manually adjusted from the retracted state to the deployed state) and during retracting operations (i.e., when peripheral device 100-1 is manually adjusted from the deployed state to the retracted state).

As set forth above, peripheral device 100-1 includes two features that, in combination, provide a distinct commercial advantage over conventional pen-type peripheral devices. First, because cap/cover 130-1 remains attached to housing 110-1 at all times, the present invention prevents the inadvertent loss of cap/cover 130-1 while the device is in use in the manner associated with conventional removable-cap pen-type devices, thereby avoiding damage or contamination of USB plug connector 150-1. Further, because the deploying/retracting operations of peripheral device 100-1 are entirely manually performed and locking functions are entirely performed by structures (e.g., locking structures 115-1 and 135-1) that are integrally molded into the remaining plastic parts (e.g., housing 110-1 and cap/cover 130-1) that make up the entirety of peripheral device 100-1, both manufacturing costs and assembly costs are less than those of conventional retractable pen-type peripheral devices. That is, manufacturing costs are minimized because, other than the PCBA, all other parts making up the entirety of peripheral device 100-1 are produced using low-cost plastic molding techniques. More specifically, peripheral device 100-1 does not require or include any separate locking mechanisms, fastening mechanisms, or spring-type deploying mechanisms that to serve the deploying or locking functions, which can significantly increase manufacturing costs. Moreover, assembly costs are minimized because, as described in additional detail below, the entire assembly process involves (a) mounting the PCBA inside housing 110-1, which involves snap-coupling locking features of the PCBA into molded receiving structures on housing 110-1, (b) mounting cap/cover 130-1 onto the front portion of housing 110-1, and an optional step (c) mounting rear cap 170 onto the rear portion of housing 110-1. No additional steps are required for securing separate locking mechanisms, fastening mechanisms, or spring-type deploying mechanisms that can greatly increase assembly time and associated costs. As such, peripheral devices produced in accordance with the present invention are both very inexpensive to both produce and assemble, and also provide the desirable feature of having a cap/cover that remains attached to the housing/body at all times, thereby providing a convenient means for protecting plug connector 150-1 from damage and contamination without the need for a removable cap, which can be lost.

Figure 2:
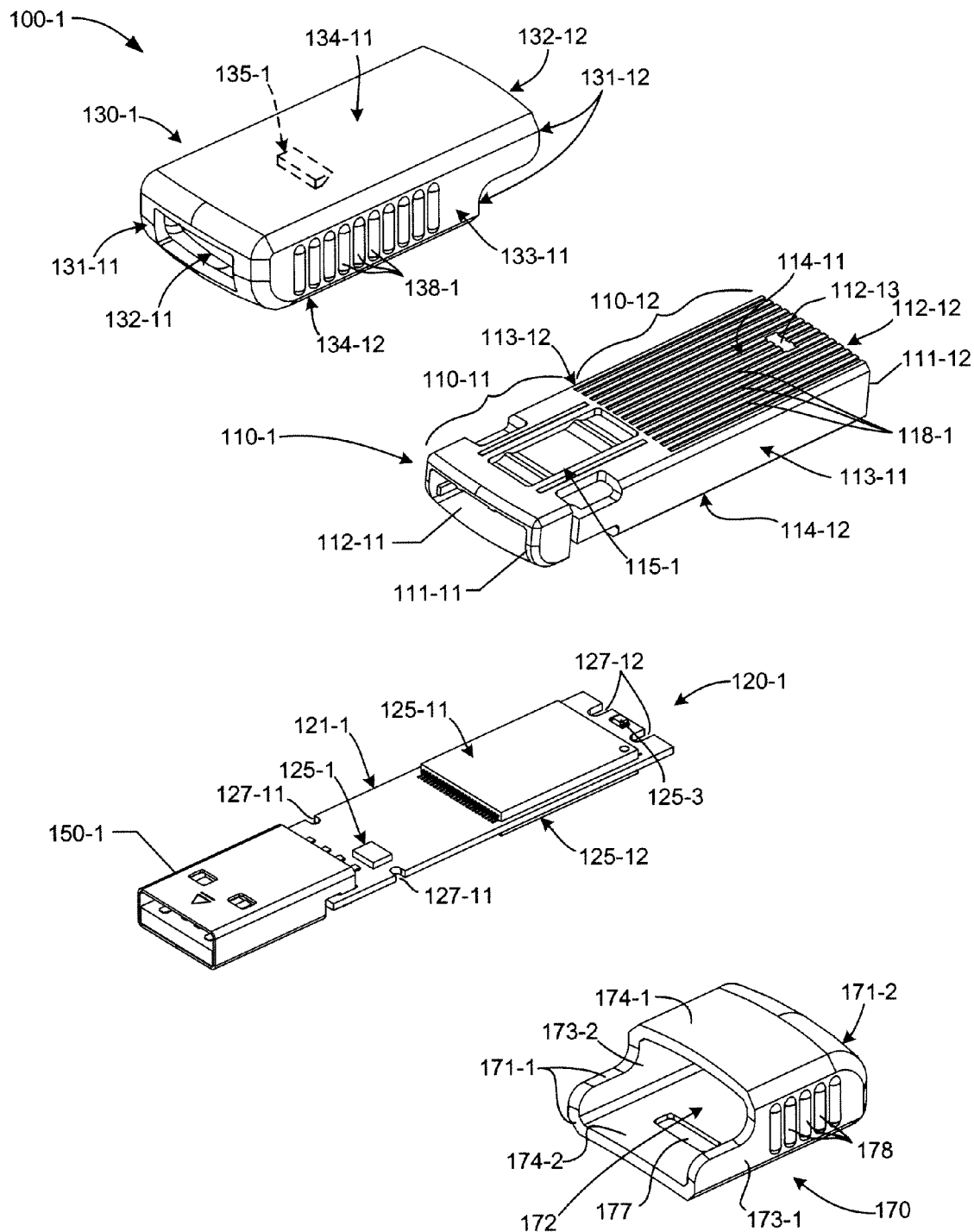
FIG. 2 is an exploded top front perspective view showing the peripheral device of FIG. 1.

FIG. 2 is an exploded perspective view showing housing 110-1, a printed circuit board assembly (PCBA) 120-1, cap/cover 130-1, and rear cap 170 of device 100-1 in additional detail.

Housing 110-1 is a substantially rectangular, single-piece integrally molded structure formed by an upper housing wall 114-11, an elongated lower housing wall 114-12, and a pair of elongated side walls 113-11 and 113-12 extending between upper housing wall 114-11 and lower housing wall 114-12. Housing 110-1 is generally divided into a front portion 110-11, which is located at a front end of housing 110-1 and includes a front edge 111-11 that defines a front opening 112-11, and a rear portion 110-12, which is located at a rear end of housing 110-1 and includes rear edge 111-12 that defines a rear opening 112-12. An elongated groove (locking structure) 115-1 is integrally molded into the upward facing surface of upper wall 114-11. An opening 112-13 is also defined in upper wall 114-11 for viewing an LED light component 125-3 disposed on PCBA 120-1. Longitudinal grooves 118-1 are integrally molded onto the upward facing surface of upper housing wall 114-11 and the downward facing lower housing wall 114-12. Additional features of housing 110-1 are provided below.

PCBA 120-1 includes a printed circuit board (PCB or card) 121-1 and a USB metal connector 150-1 that is attached to a front end of PCB 121-1 using known techniques such that PCB 121-1 is approximately aligned centered to USB metal connector 150-1. As discussed above, PCB 121-1 includes several ICs (e.g., a controller or processing unit 125-1 mounted on the upper surface of PCB 121-1, a first/upper memory device 125-11 and a lower/second memory device 125-12) disposed thereon. LED light component 125-3 is disposed near a back edge of PCB 121-1 The ICs are electronically connected together and to plug connector 150-1 using known techniques. Cut-out clearances 127-11 are defined in side edges of PCB 121-1 and cut-out clearances 127-12 are defined in the back edge of PCB 121-1 for connection of PCBA 120-1 to housing 110-1, as described below.

Cap/cover 130-1 is a substantially rectangular, single-piece integrally molded structure formed by an upper cap/cover wall 134-11, a lower cap/cover wall 134-12, and a pair of side cap/cover walls 133-11 and 133-12 extending between upper wall 134-11 and lower wall 134-12 that form a rectangular cross-section sized to fit snuggly over the peripheral surface of housing 110-1. Cap/cover 130-1 includes a front wall 131-11 that defines a front opening 132-11, and a rear edge 131-12 that defines a rear opening 132-12. A wedge-shaped locking tab (locking structure) 135-1 is integrally molded into the downward facing surface of upper wall 134-11. Rib-like protrusions 138-1 are integrally molded onto outside surface of side cap/cover walls 133-11 and 133-12. Additional features of cap/cover 130-1 are provided below.

Rear cap 170 is a substantially rectangular, single-piece integrally molded structure formed by an upper cap wall 174-1, a lower cap wall 174-2, and a pair of side cap walls 173-1 and 173-2 extending between upper wall 174-1 and lower wall 174-2 to form a rectangular cross-section that is sized to fit snuggly over the peripheral surface of housing 110-1. Rear cap 170 also includes a front edge 171-1 that defines a front opening 172-1, and a rear wall 171-2 that encloses the rear portion of rear cap 170. A locking groove (locking structure) 177 is integrally molded and defined in the upward facing surface of lower wall 174-2. Rib-like protrusions 178 are integrally molded onto outside surface of side walls 173-1 and 173-2. Additional features of rear cap 170 are provided below.

Figure 2A:
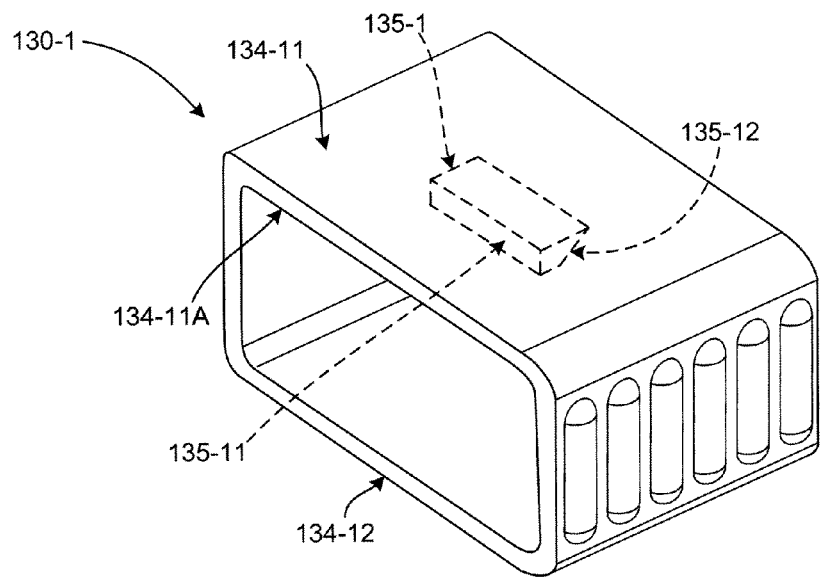
FIGS. 2A and 2B are front perspective views respectively depicting portions of the cap/cover and housing of the peripheral device of FIG. 1 in additional detail.
Figure 2B:
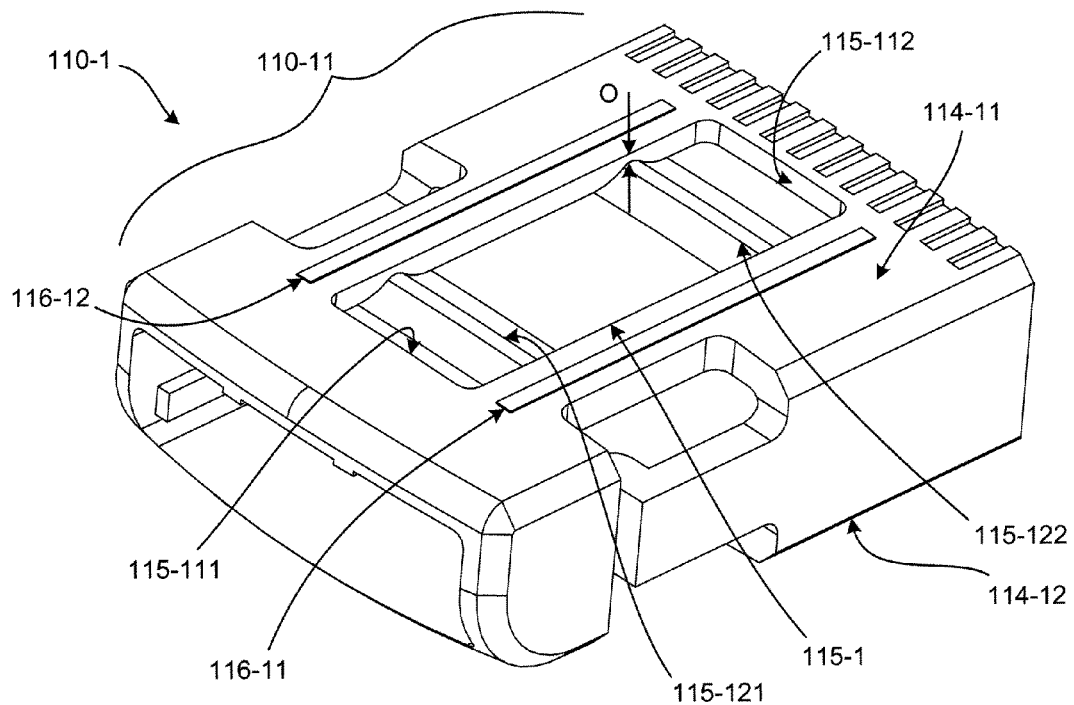

FIGS. 2A and 2B are partial front top perspective views respectively depicting wedge-shaped locking tab 135-1 of cap/cover 130-1 elongated locking groove 115-1 of housing 110-1 in additional detail. Referring to FIG. 2A, which shows a cut-away section of cap/cover 130-1, wedge-shaped locking tab 135-1 is disposed on and extends downward from inside surface 134-11A of the cap/cover 130-1, and is characterized by having a ramp-like rear surface 135-12 that facilitates the assembly process, and a flat front edge 135-11 that abuts a flat end wall 115-111 of elongated locking groove 115-1 when cap-cover 130-1 is in the retracted position. Referring to FIG. 2B, which shows front portion 110-11 of housing 110-1, elongated locking groove 115-1 extends between flat front end wall 115-111 and a flat rear end wall 115-112, and includes short sloped ridge structures 115-121 and 115-122 located in locking groove 115-1 between end walls 115-111 and 115-112 that serve to maintain wedge-shaped locking tab 135-1 in the deployed and retracted position, as described in additional detail below. Note that ridge structures 115-121 and 115-122 are shorter than end walls 115-111 and 115-112 by an offset distance 0, as shown in FIG. 2B. Elongated sliding ribs 116-11/12 are integrally molded onto the upper housing wall 114-11 and extend along opposing sides of elongated locking groove 115-1, and serve to maintain the inside surface of upper cap/cover wall 134-11 an optimal distance relative to the upward facing surface of upper housing wall 114-11 in order to facilitate the operable movement of the wedge-shaped locking tab 135-1 over the sloped ridge structures 115-121 and 115-122 as described below with reference to FIGS. 5(A) to 5(C).

Figure 3A:
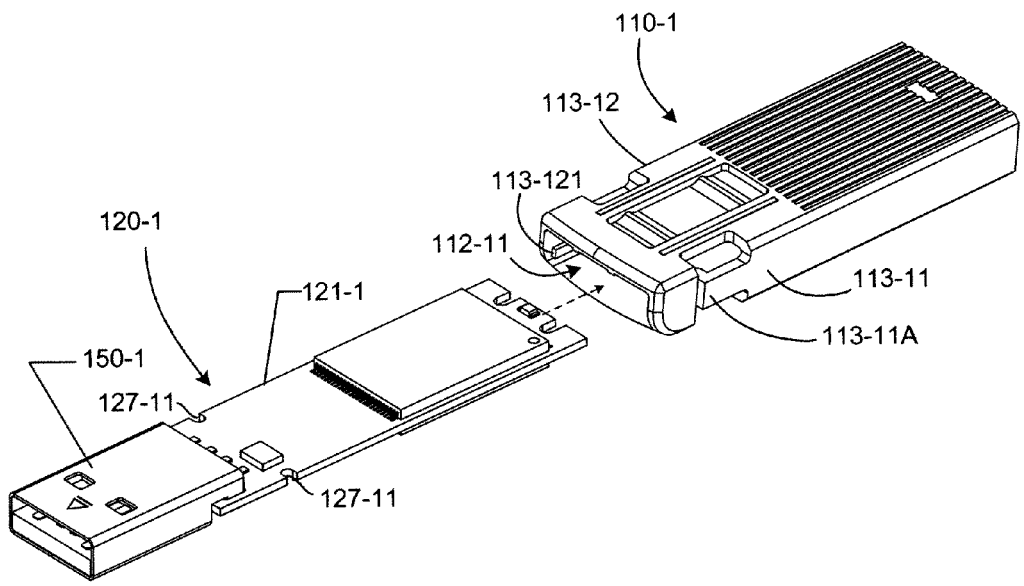
FIGS. 3(A), 3(B) and 3(C) are exploded front perspective views depicting assembly of the peripheral device of FIG. 1.
Figure 3B:
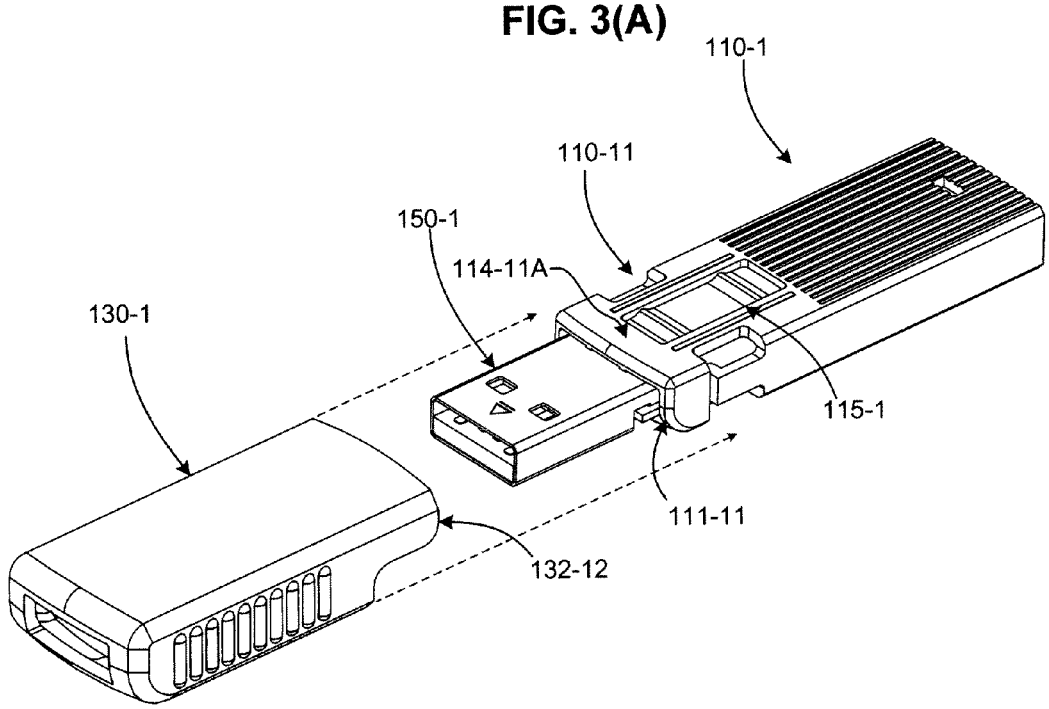
Figure 3C:
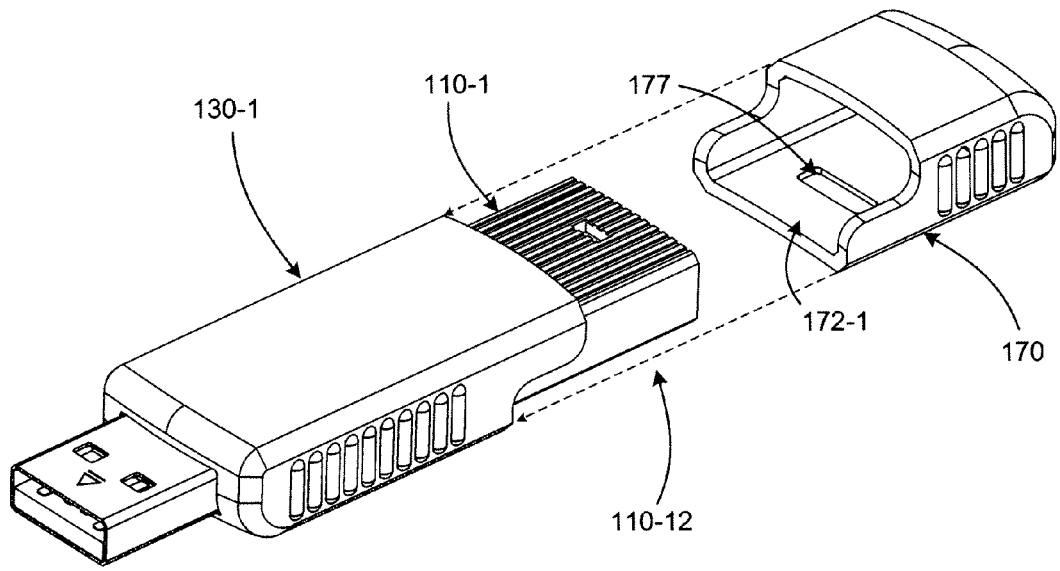

FIGS. 3(A) to 3(C) illustrate assembly of peripheral device 100-1 according to an embodiment of the present invention. According to an aspect of the present invention, by utilizing the novel structures and features associated with peripheral device 100-1, the assembly method process described below requires a minimum number of assembly steps, whereby the assembly costs associated with peripheral device 100-1 are greatly reduced over those associated with conventional pen-type peripheral devices.

As shown in FIG. 3(A), the assembly process begins by fixedly connecting PCBA 120-1 onto elongated housing 110-1. In the present embodiment, this process involves sliding or otherwise inserting PCBA 120-1 through front opening 112-11 of housing 110-1 such that PCBA 120-1 is supported on to mounting structures (e.g., rail 113-121) that are integrally molded with housing 110-1 and are disposed on inside surfaces of side walls 113-11 and 113-12, and such that plug connector 150-1 extends from front opening 112-11. Snap fingers (e.g., snap-finger 113-11A), which are tab structures that are integrally molded with housing 110-1, are provided on side walls 113-11 and 113-12, and extend into housing 110-1 to engage cut-outs 127-11 formed in the side edges of PCB 121-1. These mounting structures and engaging features facilitate easy manual or automated assembly of PCBA 120-1 onto housing 110-1, thereby minimizing assembly costs.

As shown in FIG. 3(B), the assembly process next involves mounting a cap/cover 130-1 onto front portion 110-11 of housing 110-1 such that front portion 110-11 extends into rear opening 132-12 of cap/cover 130-1, and such that cap/cover 130-1 is operably engaged with housing 110-1 such that it is manually slidably movable between the retracted position (e.g., shown in FIG. 1(A)), and the deployed position (e.g., shown in FIG. 1(B)). Note that this portions of the assembly requires forcing cap/cover 130-1 over front edge 111-11 such that the wedge-shaped locking tab (see tab 135-1 described above with reference to FIG. 2A) slides across front upper surface portion 114-11A before engaging into elongated locking groove 115-1, which is facilitated by the inherent resilience of the plastic molded pieces and ramp-like rear surface 135-12.

Figure 4:
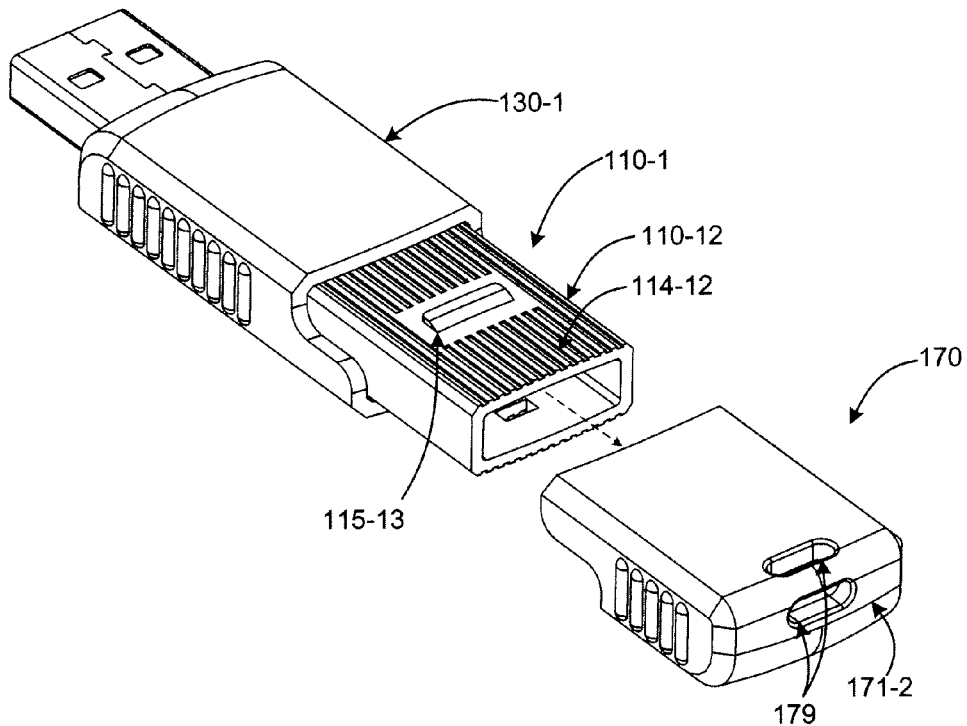
FIG. 4 is a rear bottom perspective view showing the peripheral device of FIG. 1 in additional detail.

FIG. 3(C) and FIG. 4 are top-front and bottom-rear perspective views, respectively, showing a third assembly process portion involving the fixed attachment of rear cap 170 onto rear portion 110-12 of housing 110-1 such that rear portion 110-12 extends into front opening 172-1 of rear cap 170. This process portion is completed when a (fourth) locking structure 115-13 (shown in FIG. 4) is snap-coupled (received) inside locking groove 177 formed in rear cap 170 (shown in FIG. 3(C)). As shown in FIG. 4, rear cap 170 includes a key-chain opening 179 defined in rear cap wall 171-2 for connecting the peripheral device to a key ring or string. In an alternative embodiment, ultrasonic welding may be used in place of the snap-coupling mechanism described above to secure housing 110-1 to rear cap 170.

Figure 5A:
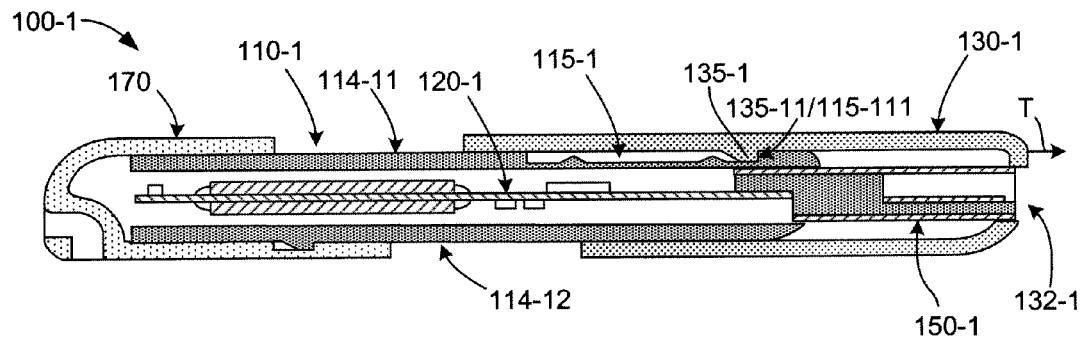
FIGS. 5(A), 5(B) and 5(C) are simplified cross-sectional side views depicting the peripheral device of FIG. 1 during a deploying operation.
Figure 5B:
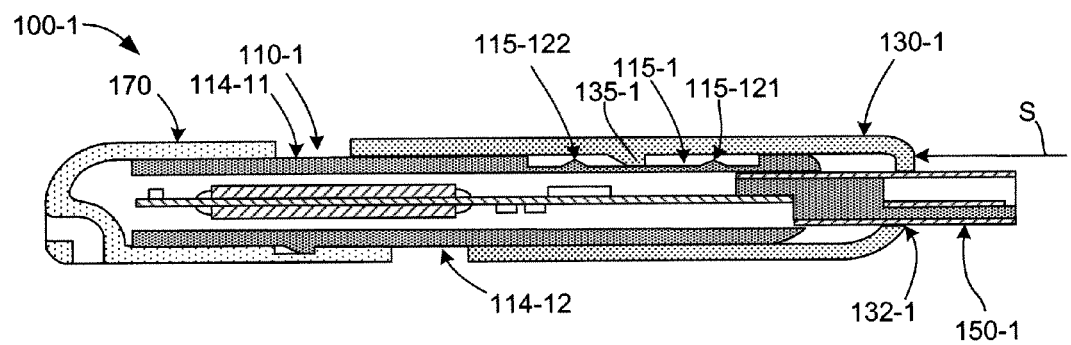
Figure 5C:
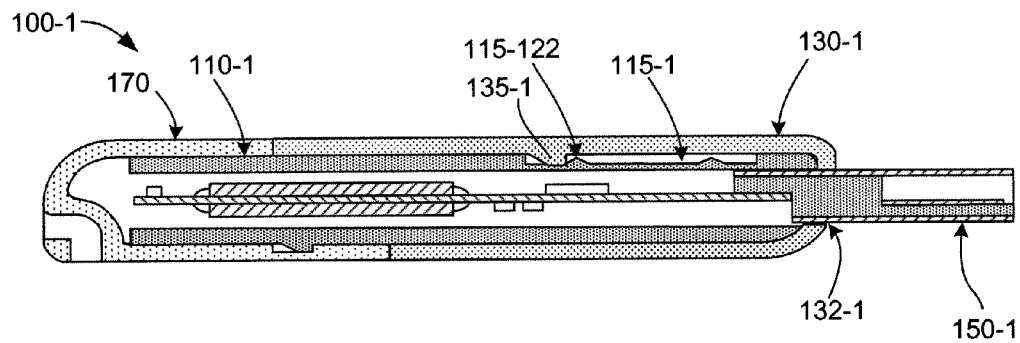

FIG. 5(A)-5(C) are simplified cross-sectional side views showing peripheral device 100-1 during an exemplary deploying operation.

FIG. 5(A) shows peripheral device 100-1 with cap/cover 130-1 in the fully retracted position at the start of the deploying operation, whereby plug connector 150-1 is positioned inside front opening 132-1 of cap/cover 130-1, and a portions of upper housing wall 114-11 and lower housing wall 114-12 of housing 110-1 are exposed between cap/cover 130-1 and rear cap 170. Note that rear cap 170 covers rear opening 112-12 of housing 110-1 such that PCBA 120-1 remains fully enclosed during all operating states. Note also that displacement of cap/cover 130-1 in the direction of arrow T relative to housing 110-1 is prevented by contact between flat front edge 135-11 of wedge-shaped locking tab 135-1 and flat end wall 115-111 of locking groove 115-1.

FIG. 5(B) shows peripheral device 100-1 with cap/cover 130-1 in a partially retracted position at a midpoint of the deploying operation, whereby plug connector 150-1 is positioned partially inside and partially outside front opening 132-1. This displacement is achieved manually by pushing cap/cover 130-1 toward rear cap 170 (i.e., in the direction of arrow S. Note that as cap-cover is pushed into this position, wedge-shaped locking tab 135-1 passes over sloped ridge structure 115-121, whereby the user feels a "click" vibration that indicates cap/cover 130-1 is no longer in the fully retracted position. Subsequent further travel of cap/cover 130-1 in the direction of arrow S causes wedge-shaped locking tab 135-1 to encounter sloped ridge structure 115-122, which provides a slight resistance prior to entering the fully deployed position.

FIG. 5(C) shows peripheral device 100-1 with cap/cover 130-1 in the fully deployed position at the end of the deploying operation, whereby plug connector 150-1 is positioned entirely outside front opening 132-1 of cap/cover 130-1, and a housing 110-1 is substantially entirely enclosed within cap/cover 130-1 and rear cap 170. Note also that displacement of cap/cover 130-1 from the fully deployed position is resisted by contact between flat front edge 135-11 of wedge-shaped locking tab 135-1 and sloped ridge structure 115-122.

To return peripheral device 100-1 to the retracted position, cap/cover 130-1 and rear cap 170 are respectively held in the hands of a user, and then pulled apart from each other until cap/cover 130-1 is returned to the fully retracted position.

Figure 6A:
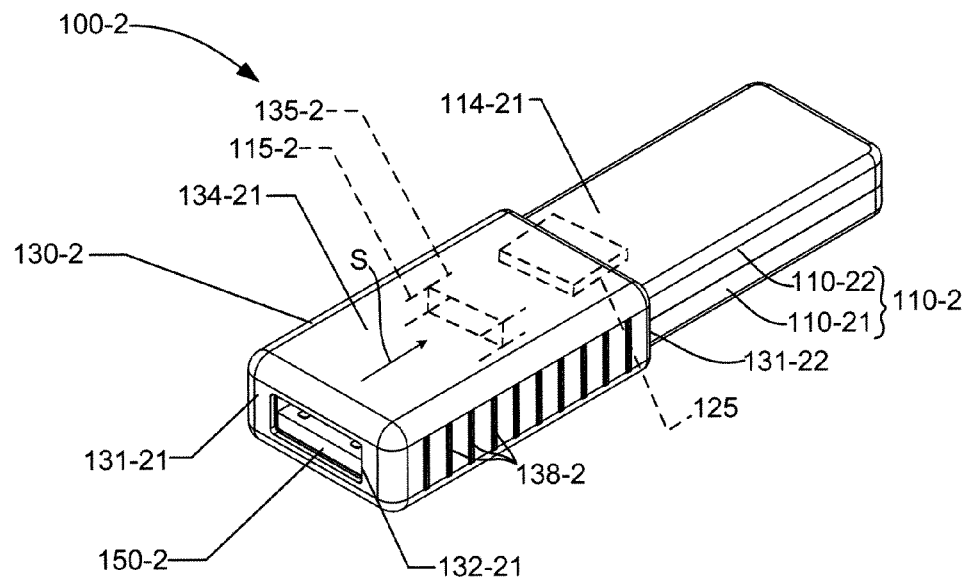
FIGS. 6(A) and 6(B) are a top front perspective view showing a pen-type computer peripheral device according to another embodiment of the present invention.
Figure 6B:
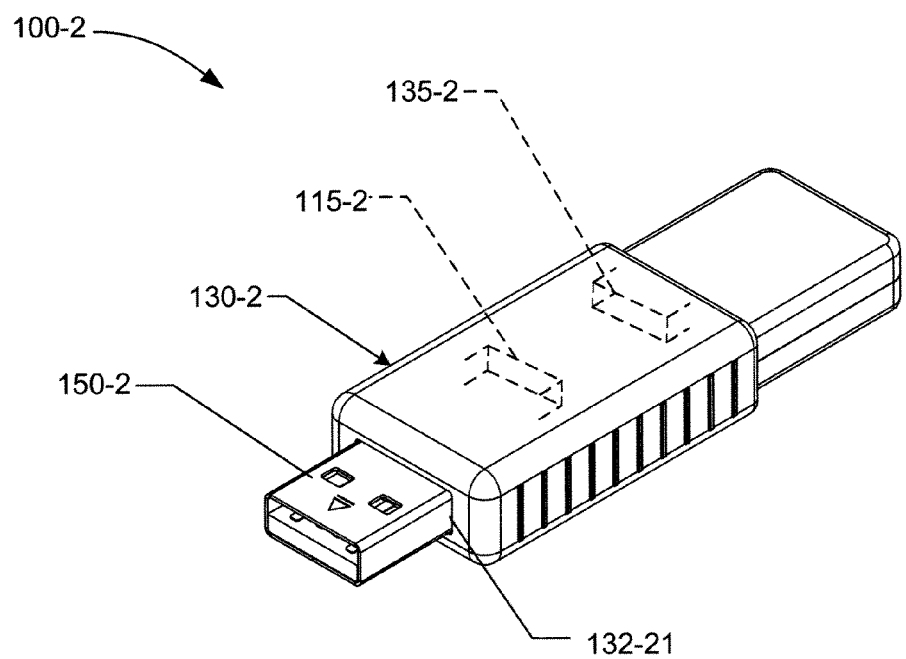

FIGS. 6(A) and 6(B) show a pocket-sized, pen-type (i.e., retractable) portable computer peripheral device 100-2 according to a second specific embodiment, where FIG. 6(A) shows peripheral device 100-2 in a fully retracted state, and FIG. 6(B) shows peripheral device 100-2 in a fully deployed state. Peripheral device 100-2 includes a two-part plastic elongated housing 110-2 that surrounds (houses) and protects a PCBA including at least one electronic device 125 (shown in dashed lines in FIG. 6(A)), and a plastic cap/cover 130-2 that is mounted onto the front portion of housing 110-2 such that cap/cover 130-2 is slidable along the front portion of housing 110-2 between the retracted position (shown in FIG. 6(A)) and the deployed position (shown in FIG. 6(B)). When peripheral device 100-2 is in the deployed position shown in FIG. 6(B), USB plug connector 150-2, which is fixedly connected to the PCBA and extends from a front portion of housing 110-2, protrudes through a front opening 132-21 defined in a front wall 131-21 of cap/cover 130-2. Conversely, when peripheral device 100-2 is in the retracted position shown in FIG. 6(A), USB plug connector 150-2 is retracted into (i.e., positioned inside of) cap/cover 130-2.

Similar to the first embodiment (described above), the deploying/retracting operations of peripheral device 100-2 are entirely manually performed. To deploy USB plug connector 150-2 for use, a user holds cap/cover 130-2 in one hand and housing 110-2 in the other hand, and manually pushes cap/cover 130-2 toward the rear end of housing 110-2 (i.e., in the direction of arrow S shown in FIG. 6(A)). Note that optional rib protrusions 138-2 are integrally molded onto cap/cover 130-2 to facilitate this manual operation. Once sufficient manual force is exerted to overcome the resistance provided by a locking structure (described below) that holds cap/cover 130-2 in the retracted position, cap/cover 130-2 slides along housing 110-2 until a front portion of housing 110-2 abuts an insides surface of front cap/cover wall 131-21. Conversely, to retract USB plug connector 150-2 for storage/transport, a user holds cap/cover 130-2 in one hand and housing 110-2 in the other hand, and manually pulls cap/cover 130-2 in a direction opposite to arrow S shown in FIG. 6(A). Once sufficient manual force is exerted to overcome a locking structure holding cap/cover 130-2 in the deployed position, cap/cover 130-2 slides along housing 110-2 until a (first) locking structure 115-2 abuts a (second) locking structure 135-2, as shown in FIG. 6(A) and described in additional detail below. Note that locking structures 115-2 and 135-2 (shown in dashed lines in FIGS. 6(A) and 6(B)) are integrally molded onto opposing surfaces of housing 110-2 and cap/cover 130-2, respectively, and integral locking structures 115-2 and 135-2 are formed to prevent separation of cap/cover 130-2 from the front portion of housing 110-2. That is, once plug connector 150-2 is in the fully-retracted position, further movement of cap/cover 130-2 on housing 110-2 is prevented by the contact between (first) locking structure 115-2 and (second) locking structure 135-2. Also similar to the previous embodiment, cap/cover 130-2 remains attached to housing 110-2 at all times after assembly utilizing locking mechanisms similar to those described above and discussed in further detail below. As such, peripheral device 100-2 includes the two features discussed above with reference to peripheral device 100-1 that, in combination, provide a distinct commercial advantage over conventional pen-type peripheral devices.

Figure 7:
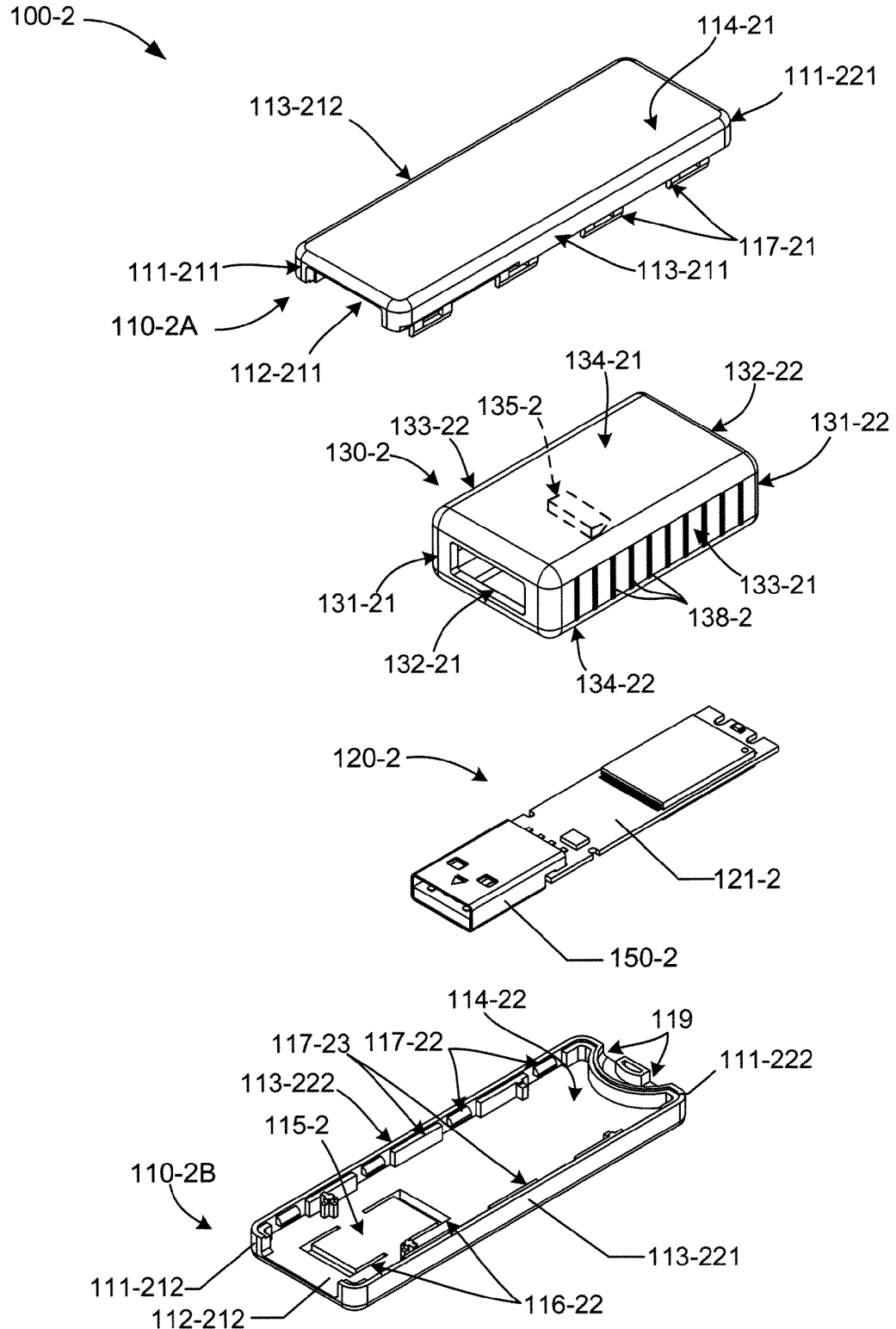
FIG. 7 is an exploded top front perspective view showing the peripheral device of FIG. 6 in additional detail.

FIG. 7 is an exploded perspective view showing housing 110-2, a printed circuit board assembly (PCBA) 120-2, and cap/cover 130-2 of device 100-2 in additional detail.

Figure 9:
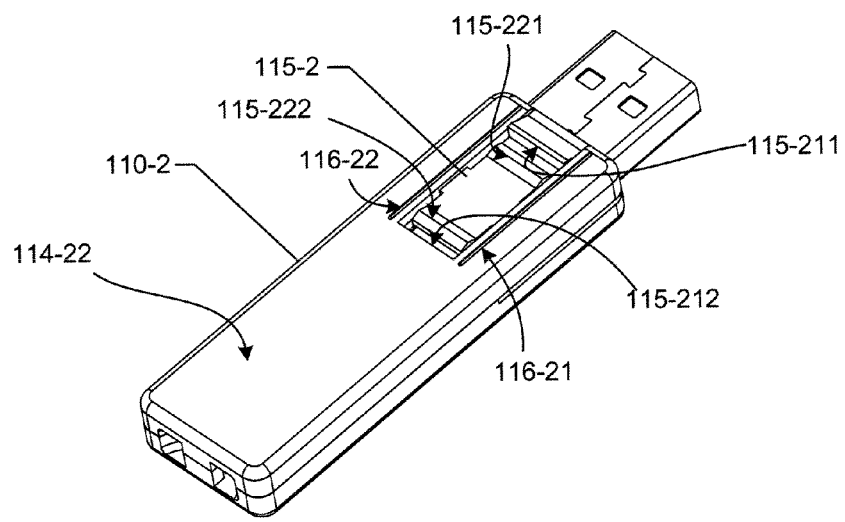
FIG. 9 is a rear bottom perspective view showing the peripheral device of FIG. 6 in additional detail.

Two-part housing 110-2 comprises two substantially rectangular, single-piece integrally molded structures including an upper (first) housing portion 110-2A and a lower (second) housing portion 110-2B. Upper housing portion 110-2A includes an upper housing wall 114-21, and also includes first side housing wall portions 113-211 and 113-212, first front wall portions 111-211 defining a first front opening portion 112-211, and a first rear housing wall portion 111-221 that extend downward from upper housing wall 114-21. Lower housing portion 110-2B includes a lower housing wall 114-22, and also includes second side housing wall portions 113-221 and 113-222, second front wall portions 111-212 defining a second front opening portion 112-212 and a rear housing wall portion 111-222 extending upward from lower housing wall 114-22. An elongated groove (locking structure) 115-2, which is shown and described below with reference to FIG. 9, is integrally molded into the downward facing surface of lower wall 114-22, and is substantially surrounded by peripheral slots 116-22 that serve to facilitate resilient deformation of elongated groove 115-2. Locking slots 117-21 are integrally formed on and extend downward from side wall portions 113-211 and 113-212 of upper housing portion 110-2A, and are arranged to snap-couple (engage) with locking tabs 117-22, which are integrally formed on the inside surfaces of side wall portions 113-221 and 113-222 of lower housing portion 110-2B.

PCBA 120-2 is substantially identical to PCBA 120-1 (discussed above), and includes a printed circuit board (PCB or card) 121-2 and a USB metal connector 150-2 that is attached to a front end of PCB 121-2, with several ICs (e.g., a controller or processing unit and memory devices) disposed thereon.

Cap/cover 130-2 is a substantially rectangular, single-piece integrally molded structure formed by an upper cap/cover wall 134-21, a lower cap/cover wall 134-22, and a pair of side cap/cover walls 133-21 and 133-22 extending between upper wall 134-21 and lower wall 134-22 that form a rectangular cross-section sized to fit snuggly over the peripheral surface of housing 110-2. Cap/cover 130-2 includes a front wall 131-21 that defines a front opening 132-21, and a rear edge 131-22 that defines a rear opening 132-22. A wedge-shaped locking tab (locking structure) 135-2 is integrally molded into the upward facing surface of lower wall 134-22. Rib-like protrusions 138-2 are integrally molded onto outside surface of side cap/cover walls 133-21 and 133-22.

Figure 8A:
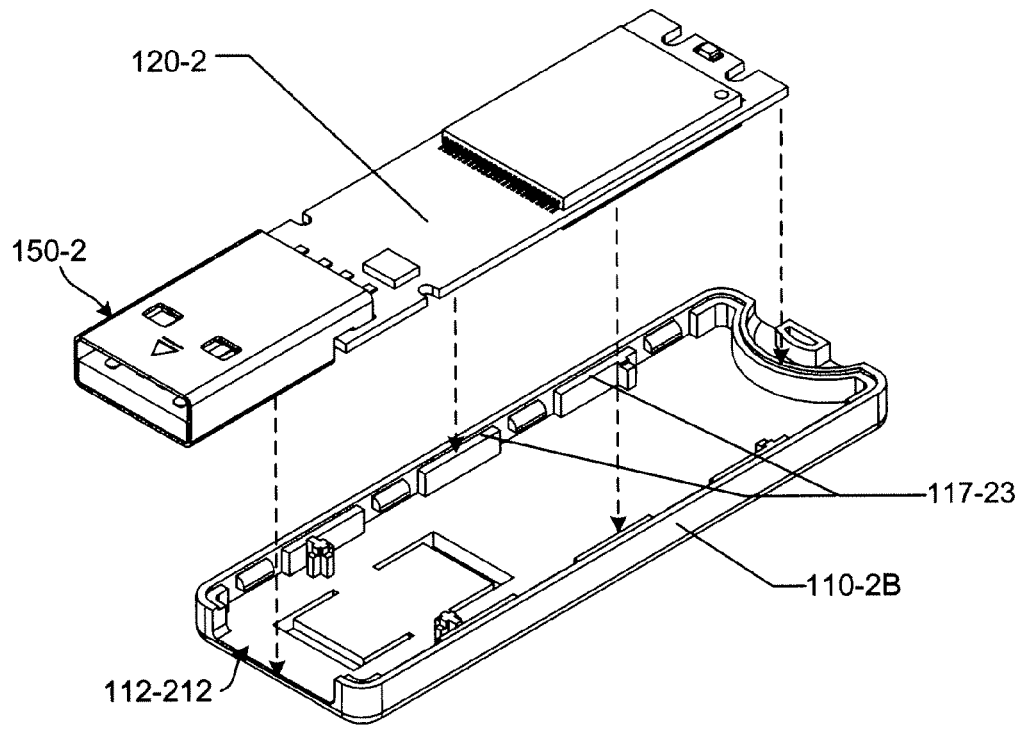
FIGS. 8(A), 8(B) and 8(C) are exploded perspective views depicting assembly of the peripheral device of FIG. 6.
Figure 8B:
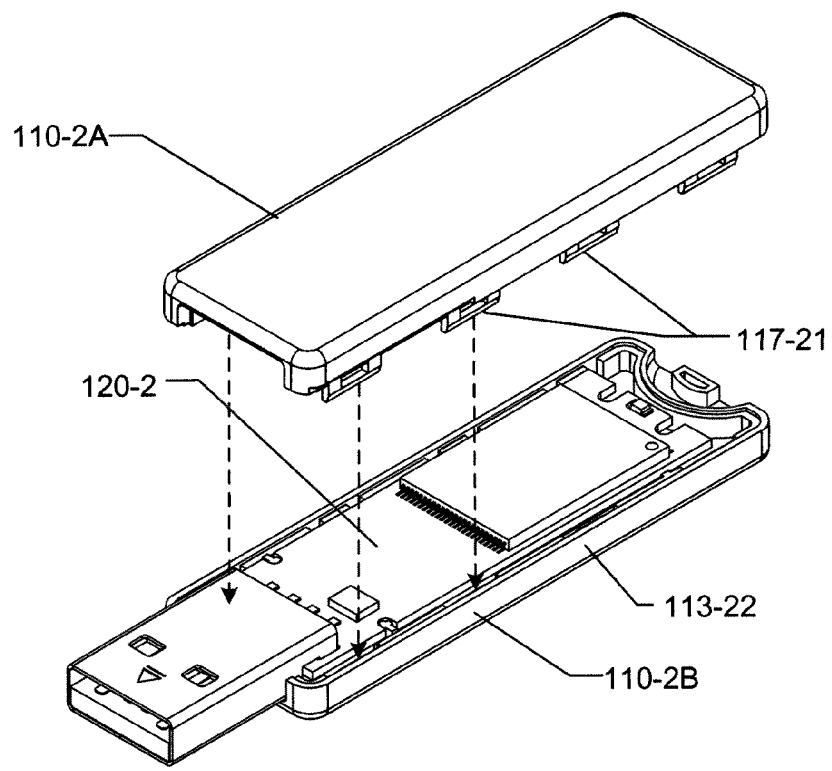
Figure 8C:
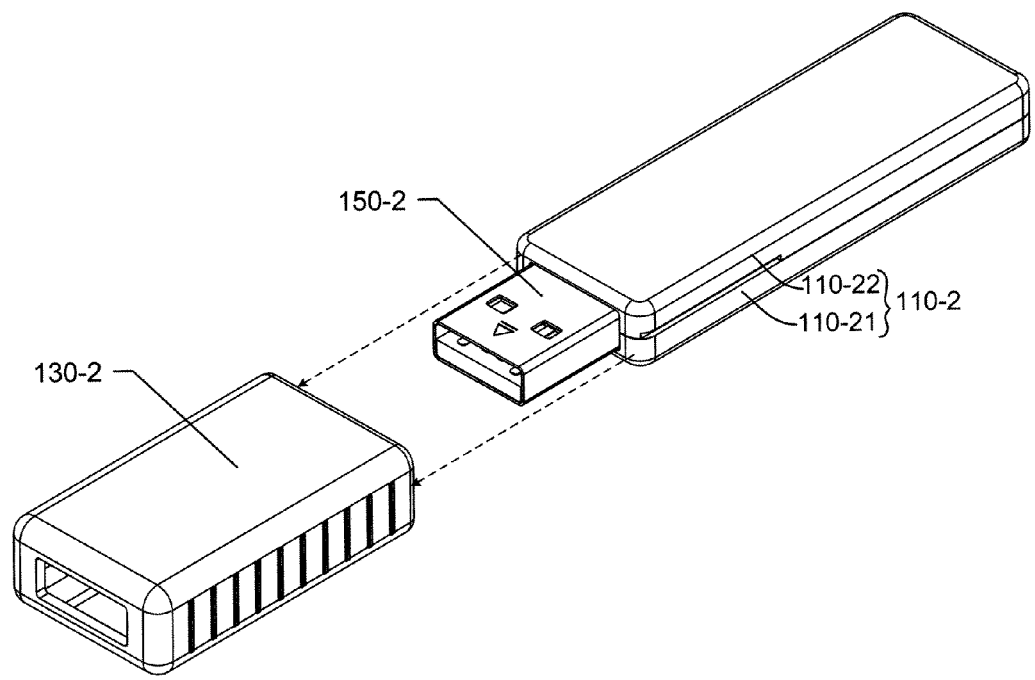

FIGS. 8(A) to 8(C) illustrate assembly of peripheral device 100-2 according to another embodiment of the present invention. FIG. 8(A) shows fixedly connecting PCBA 120-2 onto lower housing portion 110-2A such that the peripheral edges of PCBA 120-2 are supported on mounting structures (e.g., rails 117-23) that are integrally molded on lower housing portion 110-2B, and such that plug connector 150-2 extends from front opening portion 112-212. As shown in FIG. 8(B), the assembly process next involves mounting upper housing portion 110-21 onto lower housing portion 110-22 such that locking slots 117-21 snap-couple into corresponding locking tabs, thereby assembling housing 110-2 over PCBA 120-2 as indicated in FIG. 8(C). Finally, as shown in FIG. 8(C), cap/cover 130-2 is mounted onto the front portion of housing 110-2 such that plug connector 150-2 extends into the rear opening of cap/cover 130-2, and such that cap/cover 130-2 is operably engaged with housing 110-2 such that it is manually slidably movable between the retracted position (e.g., shown in FIG. 6(A)), and the deployed position (e.g., shown in FIG. 6(B)).

FIG. 9 is a bottom-rear perspective view showing housing 110-2 in additional detail, and in particular showing elongated locking groove 115-2 in additional detail. Similar to the locking groove of the first embodiment, elongated locking groove 115-2 extends between flat front end wall 115-211 and a flat rear end wall 115-212, and includes short sloped ridge structures 115-221 and 115-222 located in locking groove 115-2 between end walls 115-211 and 115-212 that serve to maintain wedge-shaped locking tab 135-2 in the deployed and retracted position. Elongated sliding ribs 116-21 and 116-22 are respectively integrally molded onto the upper housing wall 114-21 and extend along opposing sides of elongated locking groove 115-21.

Figure 10A:
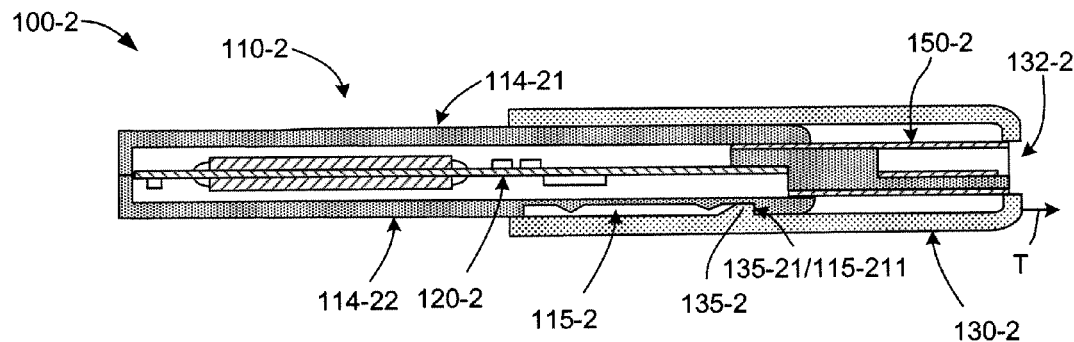
FIGS. 10(A), 10(B) and 10(C) are simplified cross-sectional end views depicting the peripheral device of FIG. 6 during operation.
Figure 10B:
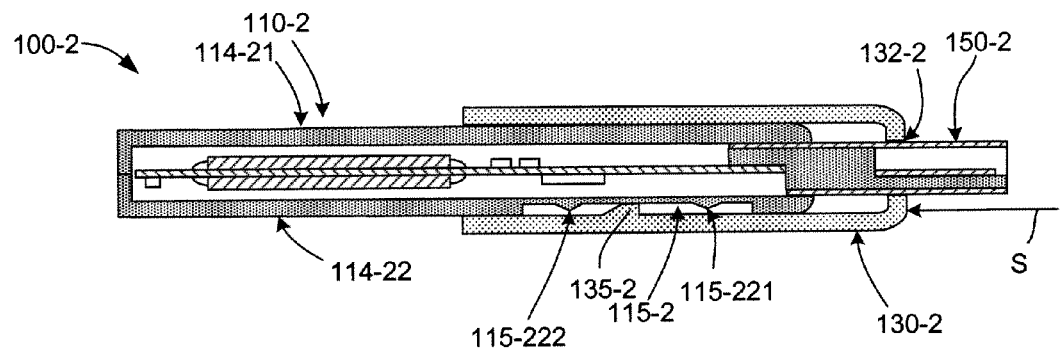
Figure 10C:
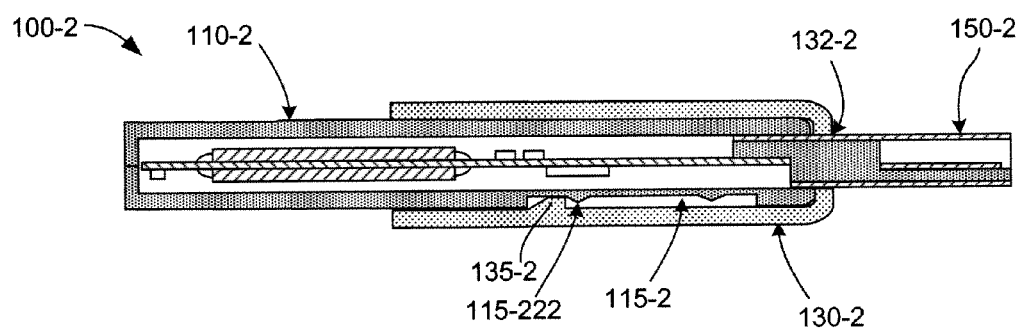

FIG. 10(A)-10(C) are simplified cross-sectional side views showing peripheral device 100-2 during an exemplary deploying operation. FIG. 10(A) shows peripheral device 100-2 with cap/cover 130-2 in the fully retracted position at the start of the deploying operation, whereby plug connector 150-2 is positioned inside front opening 132-2 of cap/cover 130-2. Note that displacement of cap/cover 130-2 in the direction of arrow T relative to housing 110-2 is prevented by contact between flat front edge 135-21 of wedge-shaped locking tab 135-2 and flat end wall 115-211 of locking groove 115-2. FIG. 10(B) shows peripheral device 100-2 with cap/cover 130-2 in a partially retracted position at a midpoint of the deploying operation, whereby plug connector 150-2 is positioned partially inside and partially outside front opening 132-2. As cap-cover is pushed into this position, wedge-shaped locking tab 135-2 passes over sloped ridge structure 115-221, whereby the user feels a "click" vibration that indicates cap/cover 130-2 is no longer in the fully retracted position. Subsequent further travel of cap/cover 130-2 in the direction of arrow S causes wedge-shaped locking tab 135-2 to encounter sloped ridge structure 115-222, which provides a slight resistance prior to entering the fully deployed position. FIG. 10(C) shows peripheral device 100-2 with cap/cover 130-2 in the fully deployed position at the end of the deploying operation, whereby plug connector 150-2 is positioned entirely outside front opening 132-2 of cap/cover 130-2. To return peripheral device 100-2 to the retracted position, cap/cover 130-2 and housing 110-2 are respectively held in the hands of a user, and then pulled apart from each other until cap/cover 130-2 is returned to the fully retracted position.

Although the present invention is described above with reference to pen-type computer peripheral devices that include standard USB plug connectors, various novel aspects of the present invention may be utilized in pen-type computer peripheral devices that utilize other connector types. For example, peripheral devices having housing and cap structures consistent with the embodiments described above may be utilized with a PCBA having a non-standard plug connector, such as that disclosed in co-owned U.S. Pat. No. 7,269,004, entitled "Low-Profile USB Device", which is incorporated herein by reference in its entirety. The PCBA with non-standard plug connector in this embodiment could either called single-chip USB using COB and molding process to form a package in rectangular shape as connector or slim USB with plastic frame holds PCB substrate inside as connector.

While the present invention is depicted in particular as a pen-type peripheral (i.e., USB flash drive) device, it should be appreciated that the present invention is applicable to any and all pocket-sized computer peripheral device types that are readily transportable and which may be advantageously interconnected with various host computer systems. Examples of such portable computer peripheral devices include, but are not limited to, flash memory and other data storage devices, communications devices, scanners and cameras. Terms such as "host computer" and "host system" are used herein to refer to any electronic computer of any type or size including, but not limited to, desktop computers (PC, Mac or other), notebook computers, palmtop computers and personal digital assistant (PDA) devices.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

The invention claimed is:

1. A portable computer peripheral apparatus comprising:
    an elongated housing having a front portion and a rear portion formed thereon, and an upper housing wall including an integrally molded first locking structure;
    at least one electronic device mounted inside of the housing;
    a plug connector fixedly connected to and extending from the front end portion of the housing and electronically connected to said at least one electronic device; and
    a cover/cap including an upper cap/cover wall having an integrally molded second locking structure formed thereon, a front wall defining a front opening, and a rear edge defining a rear opening,
    wherein the cover/cap is mounted onto the housing such that the front portion of the housing extends into the rear opening of the cap/cover, and such that the cap/cover is manually slidably movable between a first position, in which the plug connector is substantially entirely disposed inside of the cap/cover, and a second position in which the plug connector extends through the front opening of the cap/cover such that the plug connector is exposed outside of the cap/cover, and
    wherein, when the cover/cap structure is in the first position, slidable movement of the cap/cover along the housing away from a rear portion of the housing is prevented by contact between the first locking structure and the second locking structure,
    further comprising a printed circuit board (PCB) fixedly mounted inside of the housing, wherein the plug connector is attached to a first end of the PCB,
    wherein the plug connector is mounted onto a front edge of the PCB, wherein the PCB includes side edges defining cut-outs,
    wherein the housing comprises mounting structures that are integrally molded to the inside surface of the housing, and both support the side edges of the PCB and engage the cut-outs, wherein the housing comprises an integrally molded structure including said upper housing wall, an elongated lower housing wall, and a pair of elongated side housing walls extending between the upper and lower housing walls such that the upper, lower, and side housing walls form a generally rectangular cross-section, and wherein the front portion of the housing is located at a first end of the upper, lower, and side housing walls and the rear end portion is located at a second end of the upper, lower, and side housing walls, further comprising a rear cap including an upper rear cap wall, a lower rear cap wall having an integrally molded third locking structure formed thereon, a front edge defining a front opening, and a rear cap wall, wherein the housing further comprises a fourth locking structure formed on an downward-facing surface of the lower housing wall on the rear portion of the housing, and wherein the rear cap is fixedly mounted onto the housing such that the rear portion of the housing extends into the front opening of the rear cap, and such that the third locking structure is snap-coupled with said fourth locking structure.

2. The apparatus of claim 1, wherein the first locking structure comprises an elongated locking groove defined in an upward-facing surface of the upper housing wall on the front portion of the housing, wherein the second locking structure comprises a wedge-shaped locking tab that is integrally molded with and extends from an inside surface of the upper cap/cover wall, wherein the wedge-shaped locking tab extends into the elongated locking groove, and wherein a flat front edge of the wedge-shaped locking tab abuts a flat end wall of said locking groove when said cover/cap structure is in the first position.

3. The apparatus of claim 2, wherein the first locking structure further comprises first and second sloped ridge structures disposed inside said elongated locking groove, each of said sloped ridge structures having a height that is lower than said flat end wall of said locking groove, whereby movement of said cap/cover from said retracted position requires applying a first manual force in order to slide the wedge-shaped locking tab over the first sloped ridge structure, and moving the cap/cover from said deployed position requires applying a second manual force in order to slide the wedge-shaped locking tab over the second sloped ridge structure.

4. The apparatus of claim 3, wherein the first locking structure further comprises first and second elongated sliding ribs extending upward from said upper housing wall and extending along opposing sides of said elongated locking groove.

5. The apparatus of claim 1, wherein the rear cap further comprises a key-chain opening defined in the rear cap wall.

6. The apparatus of claim 1, wherein both the cap/cover and the rear cap further comprise rib-like protrusions that are integrally molded onto outside surfaces thereof.

7. The apparatus of claim 1, wherein the plug connector comprises a Universal Serial Bus (USB) plug.

* * * * *